(12) United States Patent
Dobin et al.

(10) Patent No.: US 7,974,031 B2
(45) Date of Patent: Jul. 5, 2011

(54) SINGLE-PASS RECORDING OF MULTILEVEL PATTERNED MEDIA

(75) Inventors: Alexander Y Dobin, Milpitas, CA (US);
Hans J Richter, Palo Alto, CA (US);
Erol Girt, Fremont, CA (US)

(73) Assignee: The Bank of Nova Scotia, as Administrative Agent, Toronto (CA)

( * ) Notice: Subject to any disclaimer, the term of this patent is extended or adjusted under 35 U.S.C. 154(b) by 33 days.

(21) Appl. No.: 12/559,205

(22) Filed: Sep. 14, 2009

(65) Prior Publication Data
US 2010/0020437 A1 Jan. 28, 2010

Related U.S. Application Data

(62) Division of application No. 11/544,609, filed on Oct. 10, 2006, now abandoned.

(51) Int. Cl.
*G11B 20/16* (2006.01)

(52) U.S. Cl. ............... 360/44; 360/45; 360/55; 360/59

(58) Field of Classification Search .................. None
See application file for complete search history.

(56) References Cited

U.S. PATENT DOCUMENTS

| | | | | |
|---|---|---|---|---|
| 5,458,987 A * | 10/1995 | Sato et al. | .................. | 428/820.6 |
| 5,583,727 A * | 12/1996 | Parkin | .......................... | 360/324 |
| 5,820,769 A | 10/1998 | Chou | ............................. | 216/22 |
| 5,956,216 A * | 9/1999 | Chou | ............................ | 360/131 |
| 6,391,430 B1 * | 5/2002 | Fullerton et al. | ............... | 428/212 |
| 6,421,195 B1 * | 7/2002 | Rubin et al. | ..................... | 360/48 |
| 6,493,183 B1 * | 12/2002 | Kasiraj et al. | ............ | 360/125.44 |
| 6,660,357 B1 * | 12/2003 | Litvinov et al. | ............... | 428/827 |
| 6,865,044 B1 * | 3/2005 | Albrecht et al. | ................ | 360/59 |
| 6,882,488 B1 * | 4/2005 | Albrecht et al. | ................ | 360/55 |
| 6,906,879 B1 | 6/2005 | Albrecht et al. | ................ | 360/55 |
| 6,947,235 B2 | 9/2005 | Albrecht et al. | ................ | 360/55 |
| 2005/0122609 A1 * | 6/2005 | Albrecht et al. | ................ | 360/55 |

OTHER PUBLICATIONS

M. Albrecht, "Magnetic Dot Arrays with Multiple Storage layers", Journal of Applied Physics 97, 103910 (2005).

* cited by examiner

*Primary Examiner* — Dismery E Mercedes
(74) *Attorney, Agent, or Firm* — Ladas & Parry, LLP

(57) ABSTRACT

A method of performing data/information recording and retrieval utilizing a multilevel patterned magnetic medium, comprises providing a magnetic recording system including a read/write head and a multilevel patterned magnetic recording medium including a plurality of spaced apart data/information storage elements each comprising a stacked plurality n of magnetic recording cells with different magnetic properties and magnetically decoupled from overlying and/or underlying cells; providing relative movement between the write head and magnetic recording medium; and writing to the medium by supplying the write head with a modulated write current comprising a plurality n of pulses of different magnitudes while the head passes over each element, thereby applying n different magnetic field strengths to each element, such that the writing occurs in a single pass of the write head over each element.

16 Claims, 1 Drawing Sheet

SINGLE-PASS RECORDING OF MULTILEVEL PATTERNED MEDIA

RELATED APPLICATION

This application is a divisional of and commonly-assigned application Ser. No. 11/544,609, filed on Oct. 10, 2006 now abandoned, by Dobin et al. application Ser. No. 11/544,609 is incorporated by reference herein in its entirety.

FIELD OF THE INVENTION

The present invention relates to an improved method of recording data/information on multilevel patterned magnetic recording media comprising an array of discrete magnetic elements each including a stacked plurality of magnetic recording levels. The invention enjoys particular utility with hard disk-based, very high areal recording density magnetic data/information storage systems utilized in computer-related applications.

BACKGROUND OF THE INVENTION

Designers, manufacturers and users of electronic computers and computing systems require reliable and efficient equipment for storage and retrieval of information in digital form. Conventional storage systems, such as magnetic disk drives, are typically utilized for this purpose and are well known in the art. However, the amount of information that is digitally stored continually increases, and designers and manufacturers of magnetic recording media work to increase the storage capacity of magnetic disks.

In conventional magnetic disk data/information storage, the data/information is stored in a continuous magnetic thin film overlying a substantially rigid, non-magnetic disk. Each bit of data/information is stored by magnetizing a small area of the thin magnetic film using a magnetic transducer (write head) that provides a sufficiently strong magnetic field to effect a selected alignment of the small area (magnetic grain) of the film. The magnetic moment, area and location of the small area comprise a bit of binary information which must be precisely defined in order to allow a magnetic read head to retrieve the stored data/information.

Such conventional magnetic disk storage media incur several drawbacks and disadvantages which adversely affect realization of high areal density data/information storage, as follows:

(1) there are an infinite number of possibilities for the magnetic moments of the continuous magnetic film and, as a consequence, the write head must be able to write very precisely in order to precisely define, without error, the magnetic moment, location and area of each bit on the magnetic film;

(2) since the continuous film tends to link exchange and magnetostatic interaction between neighboring magnetic bits, when the bits are very close, writing of one bit can result in writing of neighboring bits because of the exchange and magnetostatic interaction, causing errors in reading;

(3) the absence of physical boundaries between many bits of the continuous magnetic film cause the writing and reading process to occur in a "blind" fashion, i.e., the location of each bit is determined by calculating the movements of the disk and the read or write heads instead of physically sensing the actual bit location;

(4) the boundaries between adjacent pairs of bits tend to be ragged in continuous magnetic films, resulting in noise generation during reading; and (5) the requirement for increased areal recording density has necessitated a corresponding decrease in recording bit size or area. Consequently, recording bit sizes of continuous film media have become extremely minute, e.g., on the order of nanometers (nm). In order to obtain a sufficient output signal from such minute bits, the saturation magnetization ($M_s$) and thickness of the film must be as large as possible. However, the magnetization quantity of such minute bits is extremely small, resulting in a loss of stored information due to magnetization reversal by "thermal fluctuation", also known as the "superparamagnetic effect".

Regarding item (5) above, it is further noted that for longitudinal type continuous magnetic media, wherein the magnetic easy axis is oriented parallel to the film plane (i.e., surface), magnetization reversal by the superparamagnetic effect may occur even with relatively large magnetic particles or grains, thereby limiting increase in areal recording density to levels necessitated by current and future computer-related applications. On the other hand, for perpendicular type continuous magnetic media, wherein the magnetic easy axis is oriented perpendicular to the film plane (i.e., surface), growth of the magnetic particles or grains in the film thickness direction increases the volume of magnetization of the particles or grains while maintaining a small cross-sectional area (as measured in the film plane). As a consequence, onset of the superparamagnetic effect can be suppressed for very small particles or grains of minute width. However, further decrease in grain width in perpendicular media necessitated by increasing requirements for areal recording density will inevitably result in onset of the superparamagnetic effect even for such type media.

The superparamagnetic effect is a major limiting factor in increasing the areal recording density of continuous film magnetic recording media. Superparamagnetism results from thermal excitations that perturb the magnetization of grains in a ferromagnetic material, resulting in unstable magnetization. As the grain size of magnetic media is reduced to achieve higher areal recording density, the superparamagnetic instabilities become more problematic. The superparamagnetic effect is most evident when the grain volume V is sufficiently small such that the inequality $K_\mu V/k_B T > 40$ cannot be maintained, where $K_\mu$ is the magnetic crystalline anisotropy energy density of the material, $k_B$ is Boltzmann's constant, and T is the absolute temperature. When this inequality is not satisfied, thermal energy demagnetizes the individual magnetic grains and the stored data bits are no longer stable. Consequently, as the magnetic grain size is decreased in order to increase the areal recording density, a threshold is reached for a given $K_\mu$ and temperature T such that stable data storage is no longer possible.

So-called "patterned" or "bit-patterned" magnetic media (the former expression will generally be utilized herein) have been proposed as a means for overcoming the above-described problems associated with continuous magnetic media, e.g., as disclosed in U.S. Pat. Nos. 5,820,769 and 5,956,216, the entire disclosures of which are incorporated herein by reference. In this context, the term "patterned" media refers to magnetic data/information storage and retrieval media wherein a plurality of discrete, independent regions of magnetic material form discrete, independent magnetic elements that function as recording bits are formed on a non-magnetic substrate. Since the regions of ferromagnetic material comprising the magnetic elements are independent of each other, mutual interference between neighboring elements can be minimized. As a consequence, patterned magnetic media are advantageous vis-a-vis continuous magnetic media in reducing recording losses and noises arising from neighboring magnetic bits. In addition, patterning of the magnetic layer advantageously increases resistance to domain wall movement, i.e., enhances domain wall pinning, resulting in improved magnetic performance characteristics.

Generally, each magnetic element has the same size and shape, and is composed of the same magnetic material as the other elements. The elements are arranged in a regular pattern over the substrate surface, with each element having a small size and desired magnetic anisotropy, so that, in the absence of an externally applied magnetic field, the magnetic moments of each discrete magnetic element will be aligned along the same magnetic easy axis. Stated differently, the magnetic moment of each discrete magnetic element has only two states: the same in magnitude but aligned in opposite directions. Each discrete magnetic element forms a single magnetic domain and the size, area and location of each element or domain is determined during the fabrication process.

During writing operation of such patterned media, the direction of the magnetic moment of the single magnetic domain or element is flipped along the easy axis, and during reading operation, the direction of the single magnetic domain or element is sensed. The direction of the magnetic easy axis of each single magnetic domain or element can be parallel or perpendicular to the surface of the domain or element, corresponding to conventional continuous longitudinal and perpendicular media, respectively. Stated differently, the nature (i.e., type) of the magnetic recording layer of the magnetic domains or elements is not critical in patterned media, and may, for example, be selected from among longitudinal, perpendicular, laminated, anti-ferromagnetically coupled (AFC), granular, superlattice, types.

Patterned media in disk form offer a number of advantages relative to conventional disk media. Specifically, the writing process is greatly simplified, resulting in much lower noise and lower error rate, thereby allowing much higher areal recording density. In patterned disk media, the writing process does not define the location, shape and magnetization value of a bit, but merely flips the magnetization orientation of a patterned single element or domain. Writing of data can be essentially perfect, even when the transducer head deviates slightly from the intended domain or element location and partially overlaps neighboring domains or elements, as long as only the magnetization direction of the intended domain or element is flipped. By contrast, in conventional magnetic disk media, the writing process must define the location, shape and magnetization of a bit. Therefore, with such conventional disk media, if the transducer head deviates from the intended location, the head will write to part of the intended bit and to part of the neighboring bits. Another advantage of patterned media is that crosstalk between neighboring domains or elements is reduced relative to conventional media, whereby areal recording density is increased. Each individual magnetic element or domain of a patterned medium can be tracked individually, and reading is less jittery than in conventional disks.

As indicated above, the escalating requirements for increased data/information storage capacity necessitate development of magnetic media with ultra-high areal recording density. In order to achieve a recording density of about 1 Tbit/in$^2$ with patterned media, a nanostructure array of magnetic elements, domains, or "dots" (as with circular columnar-shaped elements or bits) with a period of about 25 nm over a full-patterned 2.5" diameter disk surface is required. While fabrication methods supporting element or dot densities up to about 300 Gbit/in$^2$ have been demonstrated, large area ultra-high density magnetic element patterns necessary for Tbit/in$^2$ recording densities are currently unavailable or not achievable in a cost effective manner.

The use of multiple level (multilevel) magnetic storage media has been proposed as a means for increasing the areal storage density of continuous media (see, e.g., U.S. Pat. No. 5,583,727, the entire disclosure of which is incorporated herein by reference) and bit patterned media (see, e.g., M. Albrecht, et al., J. Appl. Phys. 97, 103910 (2005) or U.S. Pat. Nos. 6,865,044 B1, 6,882,488 B1, 6,906,879 B1, 6,947,235 B2, the entire disclosures of which are incorporated herein by reference). Multilevel patterned media offer an advantage over single level patterned media in that an increase in areal recording density is possible without further increase in element density, thereby facilitating manufacture. A disadvantage inherent with practical use of the multilevel continuous film media of e.g., U.S. Pat. No. 5,583,727, is that the number of magnetic grains, and hence the read signal and media noise, are divided into the multiple levels, thereby degrading the signal-to-media noise ratio (SMNR).

On the other hand, in multilevel patterned media comprising elements with a stacked plurality of magnetic cells, each cell including a magnetic recording layer is magnetically decoupled from overlying or underlying cells by non-magnetic spacer layers. Therefore, in the case of patterned media comprising a stack of cells with perpendicular magnetic recording layers of different coercivity, each cell of an element can have a magnetization moment or direction in one of two distinct directions, i.e., into or out of the plane of the magnetic layer of the cell, and this magnetization direction is independent of the magnetization direction of the other cells of that element. As a consequence, multiple magnetic states can be recorded in each element. In contrast with multilevel continuous film media, because each cell of the element constitutes a single magnetic domain, there is no increase in noise due to the multiple magnetic cells or levels. The plurality of magnetic cells or levels stacked in the bit or element generates a corresponding plurality of different readback signal levels, whereby the areal recording density is increased.

However, a disadvantage of the proposed scheme for utilizing multilevel patterned media arises from the requirement that each level be addressed individually. Stated differently, multiple passes of the write head over the media are necessary for writing data to each level. However, it is evident that, for such a write procedure, the data rate disadvantageously incurs a substantial decrease.

In view of the foregoing disadvantage/drawback associated with the use of multilevel patterned media, which disadvantage/drawback constitutes an impediment to implementation of multilevel media technology and methodology in ultra-high areal recording density applications, there exists a need for improved methodology that eliminates, or at least mitigates, the existing requirement for multi-pass writing of multilevel patterned media.

SUMMARY OF THE INVENTION

According to an aspect of the present invention, the foregoing and other advantages are obtained in part by an improved method of performing data/information recording and retrieval in a magnetic recording system that includes a multilevel patterned magnetic recording medium (preferably a disk-shaped medium) and a write head, the medium including a plurality of spaced apart data/information storage elements, each storage element including a stacked plurality n of magnetic recording cells, each magnetic recording cell having different magnetic properties, and each magnetic recording cell magnetically decoupled from overlying and/or underlying cells, the method comprising:

(a) providing relative movement between the write head and a surface of the magnetic recording medium such that the write head passes over a selected storage element; and (b) writing data/information to the selected storage element by supplying the write head with a modulated write current that includes a plurality n of pulses of different magnitudes while the write head moves passes over the selected storage element, thereby applying n different magnetic field strengths to the storage element, wherein the modulated write current includes (i) a first pulse of magnitude sufficient to write to a first cell of the element having the highest magnetic coercivity of the cells and (ii) n−1 succeeding pulses of progressively smaller magnitude for sequentially writing to the remaining n−1 lower magnetic coercivity cells of the element but of insufficient magnitude to write to progressively higher magnetic coercivity cells of the element, such that writing to the selected storage element occurs in a single pass of the write head over the selected storage element.

According to preferred embodiments of the present invention, step (a) comprises providing a magnetic recording medium wherein each of the stacked plurality n of magnetic recording cells of each of the elements has the same thermal stability; each of the stacked plurality n of magnetic recording cells of each of the elements is a perpendicular cell including a perpendicular magnetic recording layer; and each of the plurality n of perpendicular cells of each element has different magnetic properties determined by the coercivity $Hk_n$, saturation magnetization $Ms_n$ and thickness $t_n$ of its perpendicular magnetic recording layer.

Preferred embodiments of the present invention include those wherein step (c) comprises supplying the write head with a modulated write current comprising a plurality n of pulses of different magnitudes in proportion to the magnitudes of the coercivities $Hk_n$ of the perpendicular magnetic recording layers of the plurality n of perpendicular cells.

Further preferred embodiments of the present invention include those wherein step (a) comprises providing a magnetic recording medium wherein n=2 and each element of the medium includes a first perpendicular cell with a first perpendicular magnetic recording layer with coercivity $Hk_1$, saturation magnetization $Ms_1$, thickness $t_1$ and cross-sectional area A; and a second perpendicular cell with a second perpendicular magnetic recording layer with coercivity $Hk_2$, saturation magnetization $Ms_2$, thickness $t_2$ and cross-sectional area A (A being equal for the stacked cells). Preferably, step (a) comprises providing a magnetic recording medium wherein $Hk_1 > Hk_2$; and step (c) comprises supplying the write head with a modulated current comprising a first, greater magnitude pulse for writing to the first and second perpendicular cells and a second, lesser magnitude pulse for overwriting only the second perpendicular cell.

Preferably, step (a) comprises providing a magnetic recording medium wherein $Hk_1$, $Ms_1$, $t_1$ and $Hk_2$, $Ms_2$, $t_2$ are selected such that $K_1V_1 = K_2V_2$, where $K_1V_1 = 0.5 Hk_1 Ms_1 A t_1$ and $K_2V_2 = 0.5 Hk_2 Ms_2 A t_2$, wherein $K_n$=magnetic anisotropy and $V_n$=grain volume, whereby the first and second perpendicular cells have the same thermal stability.

According to still other preferred embodiments of the present invention, the method comprises a further step of:

(d) reading data/information written to the medium in step (c) by utilizing differences in the product $Ms_n t_n$ of the saturation magnetization $Ms_n$ and thickness $t_n$ of the perpendicular magnetic recording layers of each perpendicular cell.

According to embodiments of the present invention, the coercivity $Hk_n$ and $Ms_n t_n$ product of the saturation magnetization $Ms_n$ and thickness $t_n$ of each of the perpendicular magnetic recording layers of each perpendicular cell are different.

Preferably, the substrate is disk-shaped; each of the elements is circular column-shaped; and the elements are arranged in a patterned array.

Preferred embodiments of the present invention include those wherein n=2 and each element of the medium includes a first perpendicular cell with a first perpendicular magnetic recording layer with coercivity $Hk_1$, saturation magnetization $Ms_1$, thickness $t_1$, and a second perpendicular cell with a second perpendicular magnetic recording layer with coercivity $Hk_2$, saturation magnetization $Ms_2$, and thickness $t_2$, and $Hk_1 \neq Hk_2$ and $Ms_1 t_1 \neq Ms_2 t_2$.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the invention. Accordingly, the drawings and description are to be regarded as illustrative in nature, and not as limitative.

BRIEF DESCRIPTION OF THE DRAWINGS

The following detailed description of the present invention can best be understood when read in conjunction with the following drawings, in which the various features are not necessarily drawn to scale but rather are drawn as to best illustrate the pertinent features, and in which the same reference numerals are employed throughout for designating similar features.

DESCRIPTION OF THE INVENTION

Figure 1:
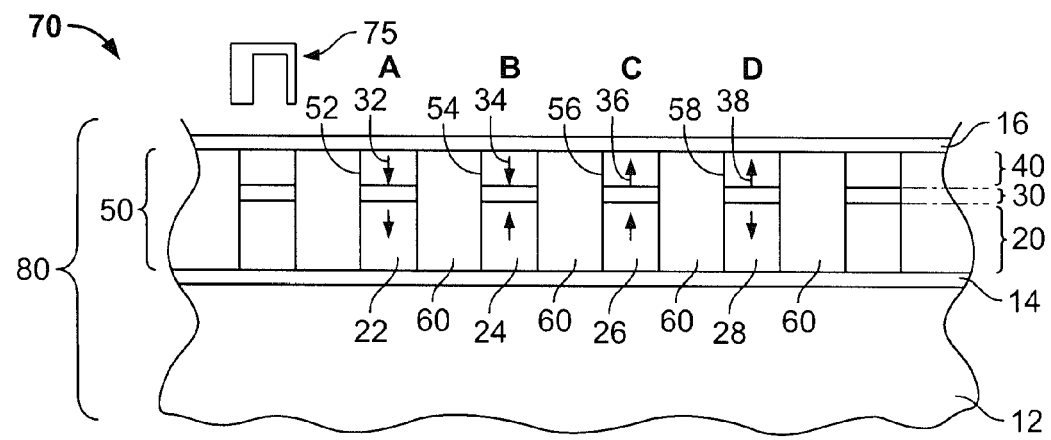
FIG. 1 is a simplified, schematic cross-sectional view of an illustrative, but non-limiting, embodiment of a patterned multilevel perpendicular magnetic recording medium/system according to the invention.

The present invention addresses and remediates the aforementioned drawbacks and disadvantages associated with conventionally structured patterned multilevel magnetic recording media, wherein each level is required to be addressed individually, thereby necessitating multiple passes of the write head over the media for writing data to each level and incurring a substantial decrease in data write rate, while maintaining full compatibility with all aspects of conventional manufacturing technology and methodology for patterned magnetic media.

Briefly stated, the present inventors have determined that improved methodology for writing to multilevel patterned magnetic media with n levels is provided by a method wherein writing to the medium in a single pass of the write head comprises supplying the write head of the system with a modulated write current comprising a plurality n of pulses of different magnitudes while the head moves past each element, thereby applying n different magnetic field strengths to each element, the modulated write current including a first pulse of magnitude sufficient to write to a first cell of each element having the highest magnetic anisotropy of the cells, and further including n−1 succeeding pulses of progressively smaller magnitude for sequentially writing to the remaining n−1 lower magnetic anisotropy cells of each element but of insufficient magnitude to write to progressively higher magnetic anisotropy cells.

Stated differently, according to the inventive methodology, recording of multilevel patterned magnetic media is accomplished in a single pass of the write head past the elements of the media by modulating the write current supplied thereto such that the highest magnetic anisotropy layer (or level) of an element is recorded and the lower magnetic anisotropy layers of the element are recorded in sequence based upon the order of decreasing magnetic anisotropy of the magnetic recording layers. The write current modulation occurs as the write head passes over each element, thereby writing to each layer or level of the element in a single pass of the head.

Multilevel recording according to the present invention increases the recording density of patterned media by a factor equal to the number n of recording layers or levels. For example, the recording density of single recording level bit patterned media having a 250 Gbit/in$^2$ bit density can be increased by a factor of 4 to 1 Tbit/in$^2$ by provision of four (4) recording levels. Further, if the initial bit (element) pattern had a linear density of 500 kbits/in. and 500 kbits/in. track density, the linear density is increased to 2,000 kbits/in. and hence the effective bit aspect ratio ("BAR") is effectively increased from BAR=1 to BAR=4, which is beneficial for recording performance. In addition, the single-pass recording method according to the present invention advantageously increases the data recording rate by a factor of four (4), since each of the four (4) data bits (levels) are written to in one pass.

Referring to FIG. 1, shown therein, in simplified, schematic cross-sectional view, is a multilevel magnetic recording system 70 comprising a write head 75 (e.g., a perpendicular write head of conventional structure, the details of which are not shown in detail in the figure in order not to unnecessarily obscure the present invention) and a patterned two level perpendicular magnetic recording medium 80 according to an illustrative, but non-limiting, embodiment of the present invention. Preferably, substrate 12 is disk-shaped and system 70 includes a disk drive (not shown in the drawing for illustrative simplicity), each of the elements is circular column-shaped and the elements are arranged in a patterned array.

As illustrated, patterned multilevel medium 80 according to the invention includes a non-magnetic substrate 12, preferably comprised of a non-magnetic metal or alloy, e.g., Al or an Al-based alloy, such as Al—Mg having a Ni—P plating layer on the deposition surface thereof, or alternatively, a suitable glass, ceramic, glass-ceramic, or polymeric material, or a composite or laminate of these materials. Overlying the surface of substrate 12 is a layer 14 (i.e., a soft magnetic underlayer or "SUL") of a soft magnetic material such as Ni, Co, Fe, a Fe-containing alloy such as NiFe (Permalloy), FeN, FeSiAl, FeSiAlN, a Co-containing alloy such as CoZr, CoZrCr, CoZrNb, or a CoFe-containing alloy such as CoFe, CoFeZrNb, FeCoB, and FeCoC. Two-level recording layer 50 includes a plurality of elements (termed "dots" when circular column-shaped), illustratively elements 52, 54, 56, and 58, spaced apart by spacer regions 60 (which may comprise a non-magnetic material). Preferably, each of the elements is circular column-shaped, and the elements are arranged in a patterned array. Each element comprises a first, lower level in the form of first cell or layer 20 including a first perpendicular magnetic recording layer comprising a first magnetic material having a first perpendicular magnetic anisotropy $K_1$, first coercivity $Hk_1$, first saturation magnetization $Ms_1$, first thickness $t_1$ and a second, upper level in the form of second cell or layer 40 including a second perpendicular magnetic recording layer comprising a second magnetic material having a second perpendicular magnetic anisotropy $K_2$, second coercivity $Hk_2$, second saturation magnetization $Ms_2$, and second thickness $t_2$. Spacer layer 30 of a non-magnetic material (e.g., of Ru or a Ru-based alloy) between first cell 20 and second cell 40 separates and magnetically decouples the cells. Overlying two-level recording layer 50 is a conventionally constituted protective overcoat layer 16, e.g., of a carbon-based material, such as diamond-like carbon ("DLC").

Each of the first, lower and second, upper cells or layers 20 and 40, respectively, may include, in addition to at least one perpendicular magnetic recording layer, several additional layers forming a layer stack including seed layers, crystal growth layers, interlayers, etc., as is known in the art. Each of the first and second perpendicular magnetic recording layers may, for example, comprise a high coercivity magnetic alloy with a hexagonal close-packed (hcp) <0001> basal plane crystal structure with uniaxial crystalline anisotropy and magnetic easy axis (c-axis) oriented perpendicular to the surface of the magnetic layer or film, typically comprising a Co-based alloy including one or more elements selected from the group consisting of Cr, Fe, Ta, Ni, Mo, Pt, W, Cr, Ru, Ti, Si, O, V, Nb, Ge, B, and Pd. However, as indicated above, the magnetic properties of each of the layers are different. It should also be noted that the invention is not limited to use of the recited Co-based alloys; rather, several other types of perpendicular magnetic recording materials and layers may be utilized for the first and second perpendicular magnetic recording layers according to the invention, including, but not limited to, granular, laminated, and multilayer superlattices, e.g., Co/Pt or Co/Pd superlattice structures.

According to the illustrated embodiment of the invention, each element 52, 54, 56, and 58 is therefore a multilevel element including two vertically stacked, magnetically decoupled cells with different magnetic properties or characteristics, i.e., cells 22 and 32 of element 52, cells 24 and 34 of element 54, cells 26 and 36 of element 56, and cells 28 and 38 of element 58. Each first, lower cell 22-28 and each second, upper cell 32-38 forms a single magnetic domain and is magnetically decoupled/separated from the other cell of its element by spacer layer 30 and from the cells of the other elements by spacer regions 60.

Medium 80 can be formed in several ways utilizing conventional techniques and methodologies. More specifically, each of the elements 52, 54, 56, 58, etc. can be formed by first lithographically patterning a resist layer on substrate 12 with SUL 14 formed thereon, depositing the various component layers of the first, lower cells 22-28, etc. over the patterned resist layer, followed by deposition of decoupling/spacer layer 30 and the various component layers of the second, upper cells 32-38, etc. and removal of the resist to leave the elements 52, 54, 56, 58, etc. on SUL 14. Alternatively, each of the above layers may be deposited in continuous fashion on the SUL 14, followed by lithographic resist patterning+etching+resist removal to define elements 52, 54, 56, 58, etc. In either instance, spacer regions or voids 60 may be filled with a non-magnetic material, e.g., alumina ($Al_2O_3$) or spin-on glass.

With continued reference to FIG. 1, as shown by letters A, B, C, D and the vertically oriented arrows in the figure, there are four (4) possible magnetic states for each element 52, 54, 56, 58, etc., each magnetic state depending upon the magnetization directions (magnetic moment) of the first, lower cells 22-28, etc., and the second, upper cells 32-38, etc. Each magnetic state in the two-level embodiment 80 of FIG. 1 can therefore be represented as a two-bit byte or word. For example, if the first, lower cells 22-28, etc. are selected as the first bit of the byte and magnetization represented by the upwardly directed arrows is considered as 0 and magnetization represented by the downwardly directed arrows is considered as 1, then the four (4) possible magnetic states are defined as follows: A=[1,1]; B=[0,1]; C=[0,0]; and D=[1,0].

While FIG. 1 illustrates a two-level embodiment 80 of the invention, embodiments with three (3) or more levels are possible. n different levels generate n different signal levels which are usable for magnetic recording, whereby the recording density is increased by a factor of n.

The present inventors have determined that the thermal stability of each cell including a perpendicular magnetic recording layer can be advantageously equalized when each cell has different magnetic properties determined by the coercivity $Hk_n$, saturation magnetization $Ms_n$ and thickness $t_n$ of its perpendicular magnetic recording layer, if $K_n V_n$ is equal for each of the stacked cells (i.e., $K_1 V_1 = K_2 V_2 = K_n V_n$), where $K_n V_n = 0.5 Hk_n Ms_n A t_n$, wherein $K_n$=magnetic anisotropy and $V_n$=grain volume of the nth perpendicular magnetic recording layer, and A=the cross-sectional area of each stacked cell. For example, in the embodiment illustrated in FIG. 1, $K_1 V_1 = 0.5 Hk_1 Ms_1 A t_1$, $K_2 V_2 = 0.5 Hk_2 Ms_2 A t_2$, and $K_1 V_1 = K_2 V_2$, whereby the first, lower and second, upper perpendicular cells of each element 52, 54, 56, 58, etc. advantageously have the same thermal stability, such that the thermal stability of medium 80 is not limited by the lowest thermal stability element.

According to the present invention, the coercivity $Hk_n$ and $Ms_n t_n$ product of the saturation magnetization $Ms_n$ and thickness $t_n$ of each of the perpendicular magnetic recording layers of each perpendicular cell are different. Therefore, as in the embodiment of FIG. 1, each element of the medium includes a first perpendicular cell with a first perpendicular magnetic recording layer with coercivity $Hk_1$, saturation magnetization $Ms_1$, thickness $t_1$ and a second perpendicular cell with a second perpendicular magnetic recording layer with coercivity $Hk_2$, saturation magnetization $Ms_2$, thickness $t_2$, the following inequalities are obtained: $Hk_1 \neq Hk_2$ and $Ms_1 t_1 \neq Ms_2 t_2$.

Figure 2:
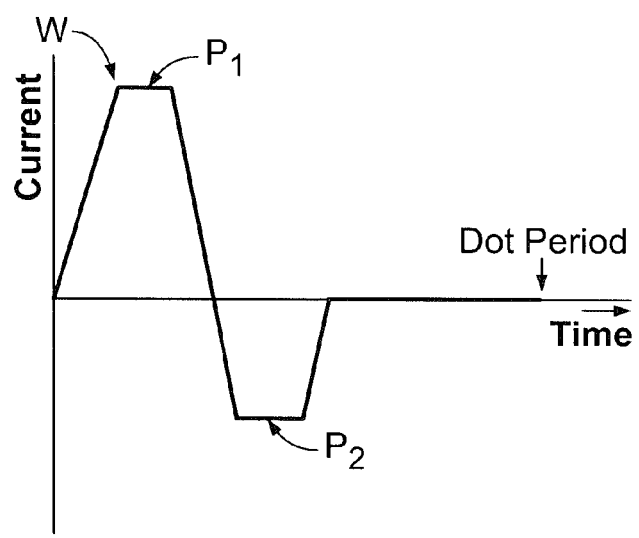
FIG. 2 shows a current modulation waveform supplied to the write head according to an illustrative, but non-limiting, embodiment of the invention.

Adverting to FIG. 2, illustrated therein is an illustrative, but non-limiting example of a current modulation waveform supplied to the write head 75 of system 70 of FIG. 1 comprising two-level patterned magnetic recording medium 80. According to the invention, the waveform W of the current supplied to write head 75, illustratively a perpendicular write head of conventional design, comprises a first pulse $P_1$ of magnitude sufficient to cause the write head 75 to apply a sufficiently strong magnetic field to each element 52, 54, 56, 58, etc. as it passes over the element so as to write to the cell with the higher coercivity, magnetically harder recording layer (illustratively, the first, or lower cells 22-28 with $Hk_1$) and the cell with the lower coercivity, magnetically softer recording layer (illustratively, the second, or upper cells 32-38 with $Hk_2 < Hk_1$). Waveform W further comprises a second pulse $P_2$ of smaller magnitude than pulse $P_1$ but sufficient to over-write the lower coercivity second, or upper cells 32-38 with $Hk_2 < Hk_1$ without over-writing the first, or lower cells 22-28 with $Hk_1 > Hk_2$.

As should be evident, each of the current pulses $P_1$ and $P_2$ must be of intervals short enough such that both pulses are accommodated within one (1) element period, i.e., the time interval during which the write head passes over a single element (or "dot") and the space 60 between adjacent elements or dots. Stated differently, current pulses $P_1$ and $P_2$ must be short enough to "fit" in one element (or "dot") period.

By extension with the above described embodiment wherein the medium includes two levels of cells, according to the invention, when writing to a patterned multilevel magnetic recording medium including magnetic elements with n levels or cells, the write head is supplied with a modulated write current comprising a plurality n of pulses of different magnitudes while the head moves past each bit, thereby applying n different magnetic field strengths to each element. In this generalized case, the modulated write current includes a first pulse of magnitude sufficient to write to a first cell of each element having the highest magnetic coercivity of the cells, and includes n−1 succeeding pulses of progressively smaller magnitude for sequentially writing to the remaining n−1 lower magnetic coercivity cells of each element, but of insufficient magnitude to write to progressively higher magnetic coercivity cells; and the writing to the medium advantageously occurs in a single pass of the write head past the elements, whereby a high data writing rate is maintained.

Stated differently, when the multilevel patterned magnetic medium comprises elements or "dots" with n levels, the method according to the invention comprises supplying the write head with a modulated write current comprising a plurality n of pulses of different magnitudes in proportion to the magnitudes of the different coercivities $Hk_n$ of the perpendicular magnetic recording layers of the plurality n of perpendicular cells.

Whereas selective writing to the stacked cells of the elements of patterned magnetic recording media relies upon the differences in coercivity Hk of the magnetic recording layers of the cells, selective reading of the stacked cells relies upon differences in the Mst products of the magnetic recording layers of the cells. The latter admits of a variety of possibilities. By way of illustration of only two of a large number of possible examples, when n=2, as in the embodiment shown in FIG. 1, if $Ms_2 t_2 = 2 Ms_1 t_1$, then it is possible that $t_1 = t_2$ and $Ms_2 = 2 Ms_1$ and it is also possible that $t_2 = 2 t_1$ and $Ms_2 = Ms_1$.

According to the invention, the read head or transducer will read signals from each of the levels of a cell in the same interval as it moves past the cell. In the illustrated 2-level embodiment, the signal from the first, lower cell is defined as 1 and corresponds to $Ms_1 t_1$ and the signal from the second, upper cell is defined as 2 and corresponds to $Ms_2 t_2$. If the effect of "spacing loss" due to the vertical spacing of the first and second magnetic layers is neglected, the read head will "see" four (4) different computed signal levels: 2+1=3; 2−1=1; −2+1=−1; and −2−1=−3.

Spacing loss, as well as reader saturation effects, may be compensated for by suitable adjustment of the Mst ratio. Should signal overlap from neighboring elements or dots become a concern in the reading process, a method utilizing peak signal detection with very narrow shield-to-shield ("STS") of the reader, such that the bit length ("BL") is equal to or greater than the STS, may be employed. Such approach directly utilizes analog reader response, unlike PRML channels which boost SMNR by reading the same element several times with a linear reader. While element or dot size fluctuation may be a source of noise in this reading scheme because the signal levels are proportional to the volume of the element or dot, fluctuation in position of the element or dot will not contribute to noise generation because of the reliance upon peak detection.

The present invention thus provides improved methodology for writing data to multilevel patterned media in a single pass of the write head, thereby maintaining data write speed at very high levels consistent with the demands of current requirements. The methodology of the present invention enjoys particular utility in computer-related applications and advantageously may be implemented by means of conventional manufacturing techniques and methodologies.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. In a magnetic recording system that includes a multilevel patterned magnetic recording medium and a write head, the magnetic recording medium including a plurality of spaced-apart data/information storage elements, each storage element including a stacked plurality n of magnetic recording cells, each magnetic recording cell having different magnetic properties, each magnetic recording cell being magnetically decoupled from overlying and/or underlying magnetic recording cells, a method of writing data/information to the storage elements, the method comprising:
   (a) providing relative movement between the write head and a surface of the magnetic recording medium such that the write head makes a pass over a storage element included in the plurality of storage elements; and
   (b) writing data/information to the storage element by supplying the write head with a modulated write current that includes a plurality n of pulses of different magnitudes while the write head makes the pass over the storage element, thereby applying n different magnetic field strengths to the storage element in a single pass of the write head over the storage element, the modulated write current including (i) a first pulse of magnitude sufficient to write to a first magnetic recording cell of the storage element having a highest magnetic coercivity of the plurality n of magnetic recording cells and (ii) n−1 succeeding pulses of progressively smaller magnitude for sequentially writing to the remaining n−1 lower magnetic coercivity magnetic recording cells of the storage element but of insufficient magnitude to write to progressively higher magnetic coercivity magnetic recording cells of the storage element.

2. The method as in claim 1, wherein each of the stacked plurality n of magnetic recording cells of each of the plurality of storage elements has the same thermal stability.

3. The method as in claim 1, wherein each of the stacked plurality n of magnetic recording cells of each of the plurality of storage elements is a perpendicular cell including a perpendicular magnetic recording layer.

4. The method as in claim 3, wherein each of the plurality n of perpendicular cells of each of the plurality of storage elements has different magnetic properties determined by the coercivity $Hk_n$, saturation magnetization $Ms_n$, and thickness $t_n$ of the perpendicular magnetic recording layer of the perpendicular cells.

5. The method as in claim 4, wherein step (b) comprises supplying the write head with a modulated write current comprising a plurality n of pulses of different magnitudes in proportion to the magnitudes of the coercivities $Hk_n$ of the perpendicular magnetic recording layers of the plurality n of perpendicular cells.

6. The method as in claim 5, wherein n=2 and wherein each of the plurality of storage elements of the magnetic recording medium includes a first perpendicular cell having a first perpendicular magnetic recording layer with coercivity $Hk_1$ saturation magnetization $Ms_1$ thickness $t_1$, and a second perpendicular cell having a second perpendicular magnetic recording layer with coercivity $Hk_2$, saturation magnetization $Ms_2$, and thickness $t_2$.

7. The method as in claim 6, wherein step (a) comprises providing a magnetic recording medium wherein $Hk_1 > Hk_2$ and step (b) comprises supplying the write head with modulated current comprising a first, greater magnitude pulse for writing to the first and second perpendicular cells, followed by a second, lesser magnitude pulse for overwriting only said second perpendicular cell.

8. The method as in claim 6, wherein step (a) comprises providing a magnetic recording medium wherein $Hk_1$, $Ms_1$, $t_1$ and $Hk_2$, $Ms_2$, $t_2$ are selected such that $K_1 V_1 = K_2 V_2$, where $K_1 V_1 = 0.5 Hk_1 Ms_1 At_1$ and $K_2 V_2 = 0.5 Hk_2 Ms_2 At_2$, wherein $K_n$=magnetic anisotropy, $V_n$=grain volume, and A=cross-sectional area of the stacked cells, whereby the first and second perpendicular cells have the same thermal stability.

9. The method as in claim 4, and further comprising:
   (c) in a single pass of the write head over the storage element, reading data/information written to the storage element utilizing differences in the product $Ms_n t_n$ of the saturation magnetization $Ms_n$ and thickness $t_n$ of the perpendicular magnetic recording layers of each perpendicular cell of the storage element.

10. A method, comprising:
   writing data/information to a storage element by supplying a write device with a modulated write current that includes a plurality n of pulses of different magnitudes while the write device passes over the storage element, so that the write device applies n different magnetic field strengths to the storage element in a single pass of the write device over the storage element, the storage element including a stacked plurality n of magnetic recording cells having different magnetic coercivities, the modulated write current including:
      (i) a first pulse of magnitude sufficient to write to a first magnetic recording cell of the storage element having a highest magnetic coercivity of the plurality n of magnetic recording cells, and
      (ii) n−1 succeeding pulses of progressively smaller magnitude for sequentially writing to the remaining n−1 lower magnetic coercivity magnetic recording cells of the storage element but of insufficient magnitude to write to progressively higher magnetic coercivity magnetic recording cells of the storage element.

11. The method of claim 10, wherein each of the stacked plurality n of magnetic recording cells has the same thermal stability.

12. The method of claim 10, wherein each of the stacked plurality n of magnetic recording cells is a perpendicular cell including a perpendicular magnetic recording layer.

13. The method of claim 12, wherein each of the plurality n of perpendicular cells has different magnetic properties determined by the coercivity $Hk_n$, saturation magnetization $Ms_n$, and thickness $t_n$ of the perpendicular magnetic recording layer of the perpendicular cells.

14. The method of claim 13, wherein the writing data/information includes supplying the write device with a modulated write current comprising a plurality n of pulses of different magnitudes in proportion to the magnitudes of the coercivities $Hk_n$ of the perpendicular magnetic recording layers of the plurality n of perpendicular cells.

15. The method of claim 14, wherein n=2 and wherein the storage element includes a first perpendicular cell having a first perpendicular magnetic recording layer with coercivity $Hk_1$ saturation magnetization $Ms_1$ thickness $t_1$, and a second perpendicular cell having a second perpendicular magnetic recording layer with coercivity $Hk_2$, saturation magnetization $Ms_2$, and thickness $t_2$.

16. The method of claim 15, wherein $Hk_1>Hk_2$, and wherein and the writing data/information includes supplying the write device with modulated current comprising a first, greater magnitude pulse for writing to the first and second perpendicular cells, followed by a second, lesser magnitude pulse for overwriting only the second perpendicular cell.

* * * * *

UNITED STATES PATENT AND TRADEMARK OFFICE
CERTIFICATE OF CORRECTION

PATENT NO. : 7,974,031 B2  
APPLICATION NO. : 12/559205  
DATED : July 5, 2011  
INVENTOR(S) : Alexander Y. Dobin et al.

Page 1 of 1

It is certified that error appears in the above-identified patent and that said Letters Patent is hereby corrected as shown below:

Title Page, Item 73

The "Bank of Nova Scotia, As Administrative Agent" and its geographical location of "Toronto, Canada M5V 2T3" listed on the Letters Patent are incorrect and should be removed. In their place, the correct assignee, "Seagate Technology, LLC" and geographical location of "920 Disc Drive, Scotts Valley, California 95067-0360" should appear.

Signed and Sealed this  
Fourth Day of June, 2013

Teresa Stanek Rea  
*Acting Director of the United States Patent and Trademark Office*